United States Patent Office 3,661,850
Patented May 9, 1972

---

3,661,850
QUINOXALINE POLYMERS, METHODS OF MAKING SAME AND COMPOSITIONS THEREOF
John K. Stille, % Department of Chemistry, University of Iowa, Iowa City, Iowa 52240
No Drawing. Continuation of application Ser. No. 819,532, Apr. 24, 1969, which is a continuation-in-part of abandoned application Ser. No. 344,232, Feb. 12, 1964. This application July 16, 1970, Ser. No. 55,588
Int. Cl. C08g 9/06
U.S. Cl. 260—50
39 Claims

ABSTRACT OF THE DISCLOSURE

Polymers containing recurring quinoxaline groups which are the reaction products of aromatic tetramines containing two sets of ortho-amine functions attached to the aromatic nucleus and tetracarbonyl compounds having the formula:

$$R-\overset{O}{\underset{\|}{C}}-\overset{O}{\underset{\|}{C}}-R_1-\overset{O}{\underset{\|}{C}}-\overset{O}{\underset{\|}{C}}-R_2$$

wherein R and $R_2$ represent a member selected from the group consisting of hydrogen and monovalent hydrocarbon groups, and $R_1$ represents a divalent hydrocarbon group. The salts of the aromatic tetramines and the hydrates of the tetracarbonyl compounds may also be used to prepare the polymers. Quinoxaline polymers can be used for making films, fibers and ahhesives as well as for other purposes. Laminated articles bonded together with these adhesive compositions, such as high temperature metal laminates are also disclosed.

---

This application is a continuation of application Ser. No. 819,532, filed Apr. 24, 1969, and now abandoned which application is a continuation-in-part application of Ser. No. 344,232, filed Feb. 12, 1964 and now abandoned.

The present invention relates to polymeric compounds containing the characteristic quinoxaline-type structure, and more particularly, to polymeric compounds formed by the reaction of an aromatic tetramine compound and a tetracarbonyl compound. The present invention further relates to methods of making the aforementioned polymeric compounds.

Suitable for use as thermally stable laminating resins, adhesive compositions, coating mterials, films and fibers in general, the quinoxaline polymers of the present invention have a wide applicability. Because of their desirable properties the polymers are valuable for high temperature metal adhesives, particularly for aluminum, steel, and titanium alloys. In addition, the polymers of the present invention are capable of functioning as high temperature cation exchange resins and as high temperature cationic catalysts in a stationary catalyst bed in a flow process. The subject polymers are also suitable for high temperature electrical insulators, battery separators, foams, ablative materials for re-entry bodies and rocket nozzles.

Accordingly, it is the object of the present invention to provide polymers and methods of making polymers, which polymers have desirable properties making them useful for a wide variety of purposes.

It is a further object of the present invention to provide resinous adhesives, coatings, laminates, films and fibers that posses desirable heat stability.

It is a further object of the present invention to provide resinous compositions that have particular application where high temperature strength and thermal stability are required.

It is a further object of the present invention to provide a method for producing polymers that are capable of withstanding high temperatures and are charactreized by high thermal stability.

In attaining the above objects, one feature of the present invention resides in reacting an aromatic tetramine containing two sets of ortho-amine functional groups attached to an aromatic nucleus with a tetracarbonyl compound. Aromatic amines can be used in the form of a salt and the tetracarbonyl compound can be in the form of the hydrate. The reaction takes place in the substantial absence of oxygen in an inert atmosphere.

Another feature of the present invention resides in conducting the polymerization in a plurality of steps wherein the mixture of reactants is first heated to the desired temperature for the reaction to comence and subsequent hereto the molecular weight of the polymer further increased by completing the reaction under reduced pressure and/or at high temperatures.

Other objects, features and advantages of the present invention, in adition to the above, will become apparent from the following detailed descripiton thereof.

According to the present invention, polymers can be prepared by reacting an aromatic tetramine containing two orthoamine functions attached to an aromatic nucleus and represented by the general formula:

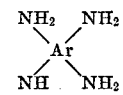

wherein Ar is an aromatic nucleus, with a tetracarbonyl compound represented by the general formula:

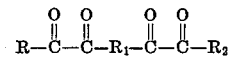

wherein R and $R_2$ are hydrogen or monovalent hydrocarbon groups and $R_1$ is a divalent hydrocarbon group.

Included among the aromatic tetramines containing two sets of ortho-amine functions are compounds of the formulae:

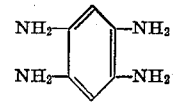

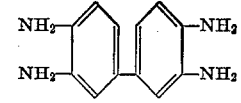

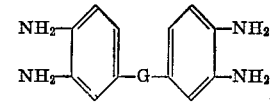

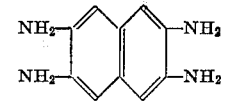

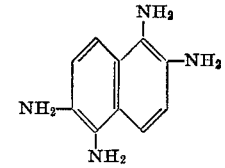

Symbol G represents a divalent organic group selected from the group consisting of alkylene, arylene, aralkylene, alkarylene, oxygen, sulfur, sulfoxide, sulfone, alkylboron, arylboron, dialkylsilicon and diarylsilicon. Suitable derivatives of the above tetramines can also be employed for purposes of the present invention. Representative of these derivatives are the salts with acids; e.g. tetrahydrochlorides.

The tetracarbonyl compounds which react with the tetramines are represented by the structural formula:

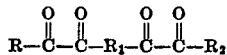

Tetracarbonyl compounds can also be employed as the hydrate for purposes of the present invention. Symbols R and $R_2$ represent members selected from the group consisting of alkyl, aryl, alkaryl, and aralkyl groups, and hydrogen, and $R_1$ is selected from the group consisting of alkylene, arylene, aralkylene and alkarylene groups.

The polymers of the present invention are produced by reacting an aromatic tetramine of the above structure with a tetracarbonyl compound as defined above by heating, preferably in an inert atmosphere, at temperatures in the range from about 25° C. to about 400° C. and more generally at a temperature of at least 40° C. To expedite the reaction, the temperature of the polymerization can be elevated to at least about 100° C. The reaction may be carried out in the presence of a solvent in which case the system is refluxed and the reaction temperature may be somewhat less than the range indicated above.

Further examples of aromatic tetramines that are suitable for the purposes of the present invention are those of the above formula wherein the group G includes alkylene groups from 1 to about 12 carbon atoms, arylene groups containing from 6 to 12 carbon atoms, aralkylene groups containing from 8 to 16 carbon atoms, alkarylene groups containing from 8 to 16 carbon atoms, alkyl boron groups containing from 1 to 5 carbon atoms, aryl boron groups containing from 6 to 12 carbon atoms, dialkyl silicon groups containing from 2 to 12 carbon atoms and diaryl silicon groups containing from 12 to 24 carbon atoms.

Representative examples of the aromatic tetramine compounds that can be employed for purposes of the present invention are listed below:

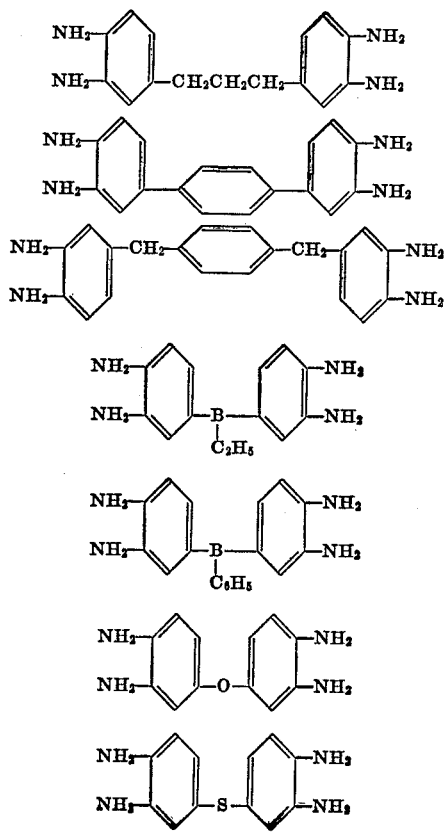

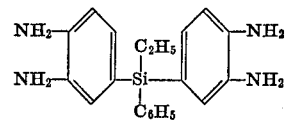

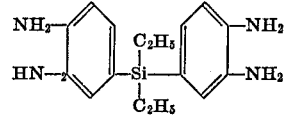

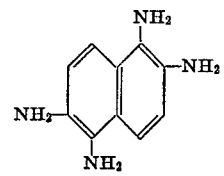

It is to be understood that each of the above tetramines may be substituted in place of the specific tetramine shown in the examples infra, with satisfactory results.

Further examples of the tetracarbonyl compounds are those of the above formulae wherein R and $R_2$ are monovalent hydrocarbon groups selected from the group consisting of alkyl groups containing from 1 to 5 carbon atoms, aryl groups containing from 6 to 12 carbon atoms, alkaryl groups containing from 7 to 20 carbon atoms and aralkyl groups containing 7 to 20 carbon atoms.

Examples of the radical $R_1$ include alkylene groups containing from 2 through 12 carbon atoms, arylene groups containing from 6 to 12 carbon atoms, aralkylene groups containing from 8 through 14 carbon atoms and alkarylene groups containing from 8 through 14 carbon atoms.

Representative tetracarbonyl compounds suitable for purposes of the present invention include the following each of which may be substituted in the examples that follow hereinafter with satisfactory results:

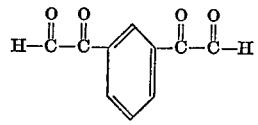

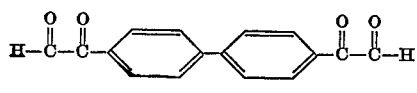

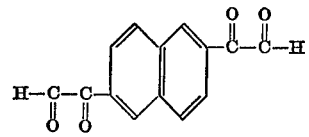

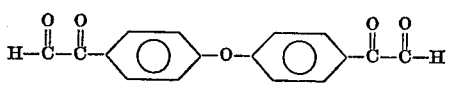

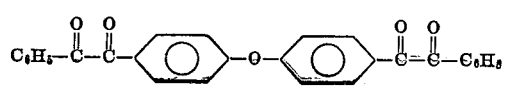

The aromatic tetramine compounds suitable for purposes of the present invention can be prepared in a variety of ways but are most conveniently prepared in a manner such as is described for 12,4,5-tetraaminobenzene in Nietzki and Schedler, Ber., 30, 1666 (1892). Similarly, the method for preparation of 3,3'-diaminobenzidine as described by Vogel and Marvel in the J. Polymer Sci., Part A, 1, 1531 (1963), may also be used.

The tetracarbonyl compounds suitable can be prepared by a variety of ways, most conveniently by the method described for the preparation of p-phenylene diglyoxal by Ruggli and Gassenmeier, Helv. Chim. Acta., 22, 496 (1939) or the method described for the preparation of m-phenylene diglyoxal by Ruggli and Theilheimer, Helv. Chim. Acta., 24, 899 (1941), or by the method described for the preparation of 4-phenylglyoxalylbenzil by Schmitt, Comoy, Boitard and Suquet, Bull. Soc. Chim. France, 636 (1956). The preparative methods described in the above periodicals can result in the m- and p-phenylene diglyoxal compounds being obtained in the form of the dihydrates. The complete disclosures of the above articles relating to the methods for preparation of the tetramines and tetracarbonyl compounds are incorporated herein by reference.

In carrying out the methods of the present invention a mixture of the aromatic tetramine and the tetracarbonyl compound are heated, preferably in the absence of oxyen. The reaction can be carried out in the presence of a solvent or, in the absence of a solvent by heating the monomers to the melting point. Suitable examples of solvents that can serve as the reaction medium include water, dioxane, dimethyl formamide, dimethyl sulfoxide, chloroform, methylene chloride, 1,2-dichloroethane, hexamethylphosphoramide phenols e.g. m-cresol or any other solvent that will dissolve the monomers. In order to eliminate the presence of oxygen an inert atmosphere can be provided by introducing nitrogen or other inert gas or, solvent vapor from refluxing solvent can be employed to blanket the reaction.

When the polymerization reaction is carried out in the absence of a solvent, the monomer mixture is heated with agitation in an inert atmosphere to a temperature sufficient to melt the monomers. Water will be evolved during the polymerization process which can be readily removed. The temperature may be held at the melting point for approximately ½ to 2 hours or, if desired, until such time that the polymer product solidifies. The temperature is then raised to about 200° to 350° C. and held at this temperature from about 2 to 5 hours. If desired, the molecular weight of the resulting polymer product may be increased in a second stage polymerization by continued heating of the reaction mixture at reduced pressures, e.g. from about 0.1 mm. to about 20 mm., at temperatures of about 300° to 400° C., from about 2 to 5 hours. The temperature ranges and duration of heating referred to above can be varied depending on particular monomer mixtures.

In solvent polymerization reactions, each of the monomers may be conveniently dissolved in a suitable mutual solvent and the solution of the tetracarbonyl compound is added to a solution of the tetramine or vice-versa in the same solvent. The solution can be heated, preferably refluxed, for at least ½ hour or more to obtain a polymer. The polymer can be isolated by precipitation, for example by cooling and adding a non-solvent such as methanol. The molecular weight of the polymer may be increased by removal of the solvent and subsequent heating of the polymer in an inert atmosphere at a temperature of at least about 150° to about 275° C. for up to about 6 hours with continued heating under reduced pressure of approximately 0.1 mm. at 300–400° C. for an additional 1 to 5 hours. The temperature ranges and time of heating given above are illustrative of the methods of the present invention and can be varied. The examples, infra, contain further illustrations of the reaction conditions of the present invention.

As an alternative method for the preparation of the polymers of the present invention, derivatives of the aromatic tetramines such as salts with acids can be used. Illustrative salts of inorganic acids are the hydrochloride or sulfate. Where the acid salt of the tetramine is employed for the production of the polymer the resulting polymer retains the acid and as a result the polymer is obtained as a salt. Preferred temperatures for obtaining the high molecular weight polymers, lie within the range of about 100° to 375° C. From the viscosities noted, molecular weights vary from about 5,000 to about 1,000,000. Physical evidence obtained indicates tat the resulting polymers have the characteristic quinoxaline structure.

As an example of the resinous compositions of the present invention, the polymer formed from 3,3-diaminobenzidine and a tetracarbonyl compound according to the following reaction is believed to have the quinoxaline structure:

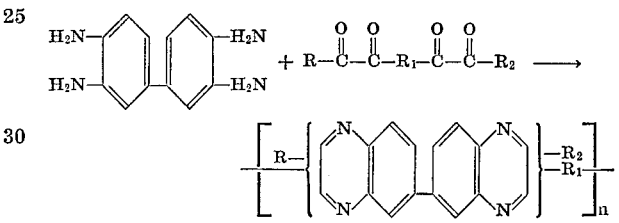

wherein $n$ represents an integer such that the products will have a sufficiently high molecular weight with an intrinsic viscosity of from about 0.01 to 3.0, measured at 25° C. as a 0.25 gram sample in 100 ml. of hexamethylphosphoramide, phenol, chloroform or other suitable solvent. Since the products are more conveniently characterized by reduced viscosity methods, they are preferred for indicating the degree of polymerization of the product.

Before reaching the ultimate state of polymerization, the polymers are generally soluble in trifluoroacetic acid, hexamethylphosphoramide, dimethyl formamide, phenols, formic acid and sulfuric acid. If it is desired to convert the polymer to a more insoluble form, the polymer produced by the initial polymerization reaction can be heated to 350° C. whereupon the solubility is substantially reduced, however, the resulting polymers are still soluble in sulfuric acid (50 to 75% soluble) and hexamethylphosphoramide (20–50% soluble). It is believed that the increase in the molecular weight is also accompanied by a cross-linking reaction which produces the partial insolubility of the resulting product.

The proportions of the monomer reactants can be varied over a considerable range, however, it is preferred to react the monomers in equimolar amounts. Although it is not necessary in the practice of the present invention to employ equimolar amounts of the monomers these proportions will generally produce the highest molecular weight in the resulting product. It is possible to vary the structure of the resulting polymer by employing a greater mole percent of one monomer in which case the polymer will generally have a reduced average molecular weight but the terminal groups of the resulting polymer will be formed by the monomer employed in the greatest amount.

Isomeric polymers can be formed by varying the positions of the R, $R_1$ and $R_2$ groups on the quinoxaline ring in the polymer product. This gives rise to isomeric recurring groups in the polymer chain. Illustrative of this isomerization, is the reaction of 3,3'-diamino benzidine and para-phenylene diglyoxal which produces a polymer in which the recurring groups are predominantly of the structure as shown:

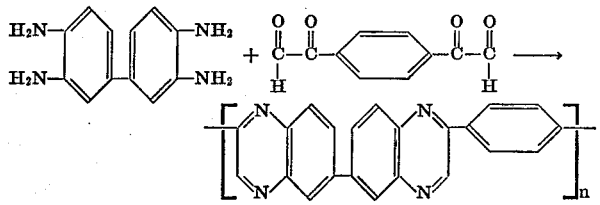

although two other types of units represented by the structures:

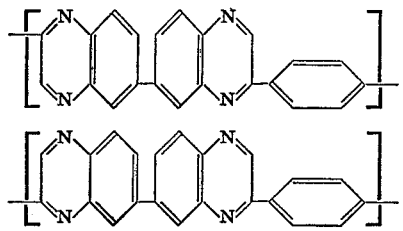

may also be present.

Particularly useful polymers which have desirable properties are those which are formed from a tetracarbonyl compound of the structure set forth above wherein R and R₂ are hydrogen or aromatic groups and R₁ is an aromatic group and from an aromatic tetramine such that the resulting polymers are entirely aromatic in nature. These polymers are desirable for their inherent properties and are applicable to a wide variety of ultimate uses because of their high melting points and high thermal stability. To illustrate, these polymers are generally stable to 500° C. in an inert atmosphere and lose only 10 to 20% of their weight at 800 to 900° C. when subjected to a thermal gravimetric analysis with a heating rate of 1 to 2 degrees per minute. Moreover, even in an oxygen atmosphere, the polymers are relatively stable up to near 500° C. Depending on the type of polymer and prior treatment, the resulting polymers may be yellow, orange, red or black.

The solubility of the polymers of the present invention varies with the degree of polymerization as well as the particular monomers chosen and can range from being completely soluble to partially soluble in such solvents as phenols, sulfuric acid, formic acid, trifluoroacetic acid and hexamethyphosphoramide. The solubility of any individual sample in these solvents depends on the particular polymer, the molecular weight and the prior heat treatment. The higher molecular weight polymers which have been subjected to eating at 375° C. under reduced pressure are the least soluble in these solvents. If the polymers are placed in solutions, they can be precipitated by addition of their solutions to a non-solvent such as water or alcohols. Where an acid solvent is employed, the acid generally remains partially bound to the polymer after it has been precipitated.

As described above, the polymers of the present invention possess excellent chemical and physical properties which make them particularly useful where high temperature properties are desired. In general, high molecular weight polymers of the present invention do not melt below 800° C. in an inert atmosphere. The lower molecular weight polymers can be fused to glass at temperatures below 800° C.

The following examples are illustrative of the present invention but are not considered limiting thereof in any way.

EXAMPLE I

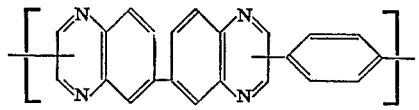

Poly[2,2'-(1,4-phenylene)-6,6'-(7,7')diquinoxaline]

To 2.0035 g. (0.00935 mole) of 3,3'-diaminobenzidine was added 2.1144 g. (0.00935 mole) of p-phenylenediglyoxal dihydrate. The two solids were thoroughly mixed under a nitrogen atmosphere in a rotating flask, and then heated to 180° C. at which time the mixture began to melt. The temperature was held at 180° C. for 1 hour during which time the polymer became solid. The temperature was then raised to 250° C. and held there for 3 hours. The entire heating was performed under nitrogen. The resulting polymer which was obtained in a nearly quantitative yield was a red powder completely soluble in concentrated sulfuric acid and had an inherent viscosity of 0.67 in hexamethylphosphoramide (0.25 g./100 ml.).

The polymer was then heated under reduced pressure (0.1 mm.) to 375° C. for 3 hours in a rotating flask containing ¼" diameter steel ball bearings to facilitate mixing. The resulting black polymer powder had an inherent viscosity of 1.28 in hexamethylphosphoramide. 70% of the polymer was soluble in sulfuric acid. Thermal gravimetric analysis showed that the polymer lost 20% of its weight in air at 480° C. and above 500° in air the weight loss was complete. The polymer only lost 20% of its weight in a nitrogen atmosphere at 800° C.

EXAMPLE II

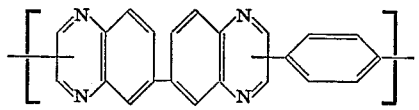

Poly[2,2'-(1,4-phenylene)-6,6'-(7,7')diquinoxaline]

To a solution of 2.816 g. (0.0131 mole) of 3,3'-diaminobenzidine in 50 ml. of purified dioxane heated to 95° C. was added with rapid stirring under nitrogen a solution of 2.972 g. (0.0131 mole) or p-phenylenediglyoxal dihydrate in 100 ml. purified dioxane at 95° C. Immediately an orange precipitate formed and the mixture was heated under nitrogen at the reflux temperature for 6 hours. The dioxane was removed under reduced pressure and the nearly quantitative yield of the orange polymer was heated under nitrogen in a rotating flask to 180° C., then to 250° and maintained at that temperature for 5 hours. The resulting orange polymer powder which did not melt during the heating was completely soluble in concentrated sulfuric acid and had an inherent viscosity in hexamethylphosphoramide of 0.79. The orange solid was heated to 375° under reduced pressure for 1 hour in a rotating flask with steel ball bearings. Half of the brown polymer powder was soluble in sulfuric acid. The soluble portion of the polymer had an inherent viscosity of 1.27 in hexamethylphosphoramide. The thermal gravimetric analysis showed the same proportions as those described in Example I.

EXAMPLE III

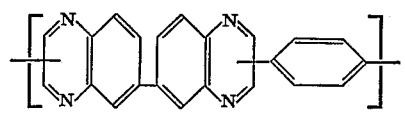

Poly[2,2'-(1,4-phenylene)-6,6'-(7,7')diquinoxaline]

To a solution of 0.587 g. (0.00163 mole) of 3,3'-diaminobenzidine tetrahydrochloride in 10 ml. of oxygen free water in a Carius tube was added a hot solution of 0.36911 g. (0.00163 mole) of p-phenylenediglyoxal dihydrate in oxygen free water. An immediate yellow precipitate was formed. The tube was alternately evacuated and filled with nitrogen three times and then sealed. The tube was slowly heated to 200° C. and held at 200° C. for 8 hours. The water was removed under reduced pressure and the yellow polymer residue was then heated at 200° C. for 3 hours. The formic acid soluble portion of the polymer had an inherent viscosity of 0.40 and and the trifluoroacetic acid soluble portion had an inherent viscosity of 0.48. The thermal gravimetric analysis of the polymer showed a 30% weight loss at 460° in air. In nitrogen, a 30% weight loss was obtained at 700° C.

EXAMPLE IV

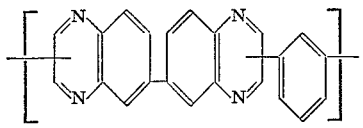

Poly[2,2'-(1,3-phenylene)-6,6'(7,7')diquinoxaline]

To a solution of 0.6722 g. (0.00314 mole) of 3,3'-diaminobenzidine in 15 ml. of freshly distilled hexamethylphosphoramide contained in a resin pot was added a solution of 0.7096 g. (0.00314 mole) of 1,3-diglyoxalylbenzene in 10 ml. of hexamethylphosphoramide. Upon mixing the solution turned a dark red. The temperature was slowly raised to 195–200° C. and held there for 6.5 hours. During this time the solution became darker in color but no precipitate was formed. After cooling, 200 ml. of methanol was added and the resulting tan precipitate was collected and dried under reduced pressure to give 1.1477 g. of tan polymer ($\eta_{inh}$ 0.26) which was subsequently treated in the second stage polymerization cycle by heating to 375° C. The material turned a black color after the temperature of the heating bath had reached 300° C. ($\eta_{inh}$ 2.42).

EXAMPLE V

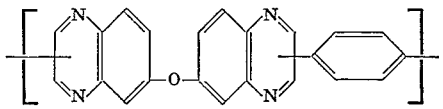

Poly[2,2'-(1,4-phenylene)-6,6'(7,7)diquinoxaline]

To 1.1736 g. (0.00509 mole) of 3,3',4,4'-tetraminodiphenyl ether in 20 ml. of hexamethylphosphoramide was added a solution of 1.1528 g. (0.00509 mole) of 1,4-diglyoxalybenzene dihydrate in 20 ml. of hexamethylphosphoramide. The mixture became dark red immediately and heating was carried out in the usual manner. At 100° C. the mixture became cloudy and after 5 minutes a red-brown precipitate appeared. Heating was continued to 195° C. and this temperature was maintained for 3 hours after which time the precipitate was collected by filtration, washed with methanol and dried to yield 1.5325 g. of dark yellow powder ($\eta_{inh}$ 0.31). A portion of the polymer that precipitated from hexamethylphosphoramide was heated in the usual manner to 375° C. and became very black. During this heating 0.6251 g. of sample lost 0.3829 g. The resulting polymer showed $\eta_{inh}$=1.30.

EXAMPLE VI

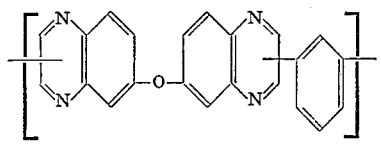

Poly[2,2'-(1,3-phenylene)-6,6'(7,7')oxy-diquinoxaline]

To a solution of 0.6177 g. (0.00268 mole) of 3,3',4,4'-tetramino-diphenyl ether in 15 ml. of hexamethylphosphoramide was added 0.6066 g. (0.00268) mole of 1,3-diglyoxalylbenzene dihydrate in 15 ml. hexamethylphosphoramide. The solution became a dark red and heating was started. There was no visible change in the mixture and the temperature was maintained at 195–200° C. for 4 hours. After cooling, 200 ml. of methanol was added and the orange precipitate that was formed was collected and dried to yield 1.0955 g. of polymer ($\eta_{inh}$=0.15). This polymer (0.7315 g.) was heated in the second stage polymerization to 357° C. and 0.6914 g. of black polymer was obtained ($\eta_{inh}$=1.76).

EXAMPLE VII

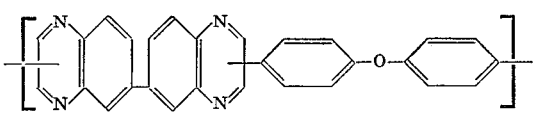

Poly[2,2'-(4,4'-diphenyl ether)-6,6'(7,7')-diquinoxaline]

A slurry of 3.18 g. (0.01 mole) of 4,4'-diglyoxalyl-diphenyl ether in 10 ml. of m-cresol was added to a slurry of 2.14 g. (0.01 mole) of 3,3'-diaminobenzidine in 10 ml. of m-cresol at room temperature under nitrogen. An additional 5 ml. of m-cresol was added to wash the residual glyoxal into the reaction flask. The reaction mixture was stirred for 1 hour, during which time the temperature was increased from 30° C. to 65° C. The resulting clear orange-brown viscous solution was stirred at 65° C. for one hour.

The m-cresol solution was then precipitated into methanol to yield a beige fibrous solid. The polymer was washed with methanol and dried under reduced pressure at 200° C. to yield 4.8 g. (98%) of polymer ($\eta_{inh}$=0.58). This polymer was heated in a second stage polymerization to 375° C. for 2 hours to yield a polymer ($\eta_{inh}$=1.2).

EXAMPLE VIII

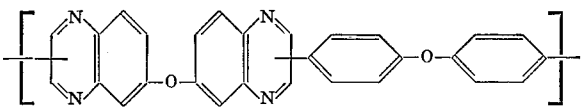

Poly[2,2'-(4,4'-diphenyl ether)-6,6'(7,7')-oxy-diquinoxaline]

To a solution of 1.0389 g. (0.00451 mole) of 3,3',4,4'-tetraminodiphenyl ether in 30 ml. of dioxane was added a solution of 1.4354 g. (0.00451 mole) of 4,4'-diglyoxalyl-diphenyl ether dihydrate in 40 ml. of dioxane. The solutions became yellow when mixed and heat was slowly applied until the reflux temperature was reached. After 45 minutes at the reflux temperature a piece of yellow material precipitated from the solution. Heating was continued for 2 more hours after which time the dioxane was evaporated under reduced pressure to yield 2.2049 g. of polymer ($\eta_{inh}$=0.40). The powder was then heated to 250° C. under nitrogen in the usual manner and 0.2740 g. of material was lost from this heating. The resulting product was a darker yellow than that which was obtained from the dioxane evaporation. Heating at 375° C. for 2.5 hours produced a shiny black polymer, ($\eta_{inh}$=1.24).

EXAMPLE IX

Ths polymerization was repeated in a hexamethylphosphoramide solvent and was followed by withdrawing alliquots from the solution to measure the viscosity.

The following results were obtained:

POLYMERIZATION CONDITIONS

| Time, hours | Temperature, °C. | $\eta_{inh}$ |
| --- | --- | --- |
| 0.5 | 30 | 0.099 |
| 1.0 | 100 | 0.26 |
| 2.5 | 100 | 0.32 |
| 1.0 | 160 | 0.34 |
| 12.0 | 160 | 0.72 |

EXAMPLE X

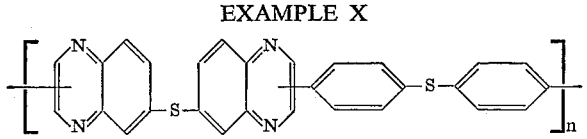

Poly[2,2'-(4,4'-thiodiphenylene)-6,6'(7,7')-thio-diquinoxaline]

To a solution containing 0.5000 g. (0.00204 mole) of 3,3',4,4'-tetraminodiphenyl sulfide in 50 ml. of hexamethylphosphoramide was added, under a nitrogen atmosphere 0.6843 g. (0.00204 mole) of 4,4'-diglyoxalyldiphenyl sulfide dihydrate. On contact of the two monomers a red color immediately formed. The solution was slowly heated to 180° C. for 10 hrs. under a stream of nitrogen. After cooling the solution to room temperature, it was added dropwise to 300 ml. of methanol which precipitated 1.4134 g. of a light brown solid. The solid was placed in a Soxhlet extracter and extracted overnight with benzene. The polymer was dried under reduced pressure over phosphorus pentoxide ($\eta_{inh}=0.35$).

In the second cycle 0.5000 g. of the prepolymer was treated at 375° C. for 2 hrs. in a rotating flask under reduced pressure (0.1 mm.). During this heating the material became dark brown and lost 0.2342 g. This indicates approximately a yield of 0.7490 g. (80%) of polymer (free of hexamethylphosphoramide) that was obtained from the solution polymerization, ($\eta_{inh}=2.40$).

EXAMPLE XI

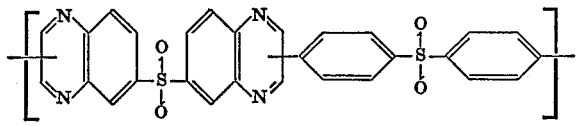

Poly[2,2'-(4,4'-sulfonyldiphenylene)-6,6'(7,7')-sulfonyl-diquinoxaline]

To a solution containing 1.000 g. (0.00359 mole) of 3,3',4,4'-tetraminodiphenyl sulfone dissolved in 50 ml. of hexamethylphosphoramide was added under a nitrogen atmosphere, 1.3139 g. (0.00359 mole) of 4,4'-diglyoxyalyl-diphenyl sulfone dihydrate. On addition of the diglyoxyl, the solution turned red. The solution was slowly heated to 100° C., was maintained at that temperature for 1 hr., and then heated to 180° C. and maintained at that temperature for 9 hrs. As the temperature increased the red color became darker and at 70° C., water could be detected on the condenser; at 180° C. the solution became cloudy; however, there were no indications of a solid precipitating. On cooling the solution to room temperature no solid precipitated and the solution remained cloudy. On the addition of the reaction mixture, into 400 ml. of absolute methanol, 2.7282 g. of a light tan solid was formed ($\eta_{inh}=0.33$). The polymer was extracted with benzene overnight in a Soxhlet extractor and then dried under reduced pressure over phosphorus pentoxide.

In the second cycle 0.5000 g. of the prepolymer was treated at 375° C. for 2 hrs. in a rotating flask under reduced pressure (0.1 mm.). As the temperature increased the polymer gradually turned from a light tan to a dark brown and lost 0.1832 g. This indicates approximately a yield of 1.6488 g. (87%) of polymer (free of hexamethylphosphoramide) that was obtained from the solution polymerization ($\eta_{inh}=1.22$).

EXAMPLE XII

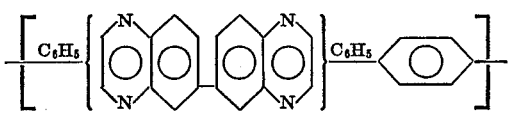

Poly[2,2'-(1,4'-phenylene)-3,3'-diphenyl-6,6'-(7,7')-diquinoxaline]

To a solution of 3.4233 g. (0.01 mole) of 1,4-bis (phenylglyoxaloyl)-benzene in 20 ml. of chloroform was added 2.1426 g. (0.01 mole) of 2,2'-diaminobenzidine in 20 ml. of chloroform. The solution was heated with stirring to the reflux temperature for 24 hours, after which time the polymer could be isolated by precipitating it into methanol, [$\eta$]=2.0.

EXAMPLE XIII

Two 1/16" sheet steel plates 3" x 6" were bonded together with a 20% chloroform solution of the polymer described in Example XII and a layer of Corning E glass (112—112) by coating the solution on a 1" strip along the 3" edge for each plate; one plate of which was layered with the E glass. The coats were dried at room temperature and then at 80° C. in an oven. The two pieces were then bonded together by spraying the edges with chloroform, pressing the plates together, and curing at 200° C. This 3" lap shear specimen showed a tensile shear test of 1900 p.s.i.

EXAMPLE XIV

A sample of polymer obtained as described in Example XII was dissolved in m-cresol to obtain a 20% solution. This solution was wet spun into methanol to give a gold fiber which had a tenacity of 2 g./denier and a modulus of 60 g./denier.

EXAMPLE XV

A 30% solution of polymer obtained as described in Exampel XII was spread onto a glass plate with a doctor knife and allowed to evaporate at 25° for 4 hrs., after which time a clear, yellow film was removed from the plate. The film was dried at 60° C. for 1 hr. in a forced draft oven.

EXAMPLE XVI

Polymer samples were subjected to thermal gravimetric analyses in both air and nitrogen atmospheres at a heating rate of 5° C./min. The major breaks which were observed in the curves were taken as the intercept of the slopes of the two lines parallel to the straight line traces before and after the rapid change in slope.

| Polymer | From Ex. | TGA breaks, °C. Nitrogen | TGA breaks, °C. Air |
|---|---|---|---|
| Poly[2,2'-(1,4-phenylene)-6,6'(7,7')-diquinoxaline]. | II | 530 | 500 |
| Poly[2,2'-(1,3-phenylene)-6,6'(7,7')-diquinoxaline]. | IV | 520 | 500 |
| Poly[2,2'-(1,4-phenylene)-6,6'(7,7')-diquinoxaline]. | V | 520 | 500 |
| Poly[2,2'-(1,3-phenylene)-6,6'(7,7')-oxy-diquinoxaline]. | VI | 530 | 500 |
| Poly[2,2'-(4,4'-diphenyl ether)-6,6'(7,7')-diquinoxaline]. | VII | 500 | 500 |
| Poly[2,2'-(4,4'-diphenyl ether)-6,6'(7,7')-oxy-diquinoxaline]. | VIII | 550 | 530 |
| Poly[2,2'-(4,4'-thiodiphenylene)-6,6'(7,7')-thio-diquinoxaline]. | X | 530 | 500 |
| Poly[2,2'-(4,4'-sulfonyl-diphenylene)-6,6'(7,7')-sulfonyl-diquinoxaline]. | XI | 450 | 450 |
| Poly[2,2'-(1,4-phenylene)-3,3'-diphenyl-6,6'(7,7')-diquinoxaline]. | XII | 530 | 510 |

In making adhesive and coating compositions, the polymers of the present invention can be dissolved in a suitable solvent along with the conventional compounding ingredients for adhesive compositions, if desired, and applied to the substrate such as aluminum, glass, and the like. The durable bond is then obtained by heating to drive off the solvent and increase the molecular weight of the polymer. Laminated structures found from a plurality of lamina can be bonded together according to the above described procedure by having disposed therebetween the resinous compositions of the present invention.

Films can be cast and fibers may be spun from the quinoxaline polymers by customary procedure as will be apparent from the foregoing examples.

What is claimed is:

1. A method for the preparation of a quinoxaline polymer comprising reacting essentially in the absence of oxygen a compound selected from the group consisting of aromatic tetramines containing two sets of ortho-amine functions attached to the aromatic nucleus and salts thereof, with a diglyoxal-type tetracarbonyl compound, having two terminal groups of the structure

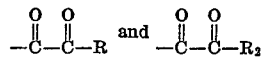

respectively, and wherein R and $R_2$ are selected from the group consisting of hydrogen and monovalent hydrocarbon groups, said polymer having an intrinsic viscosity of at least about 0.01 measured at 25° C.

2. A method for the preparation of a quinoxaline polymer comprising reacting essentially in the absence of oxygen a compound selected from the group consisting of aromatic tetramines containing two sets of ortho-amine functions attached to the aromatic nucleus and salts thereof, with a tetracarbonyl compound selected from the group consisting of structures represented by the formula:

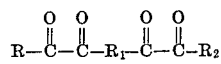

and the hydrates thereof, wherein
R and $R_2$ represent a member selected from the group consisting of hydrogen and monovalent hydrocarbon groups, and
$R_1$ represents a divalent hydrocarbon group, said polymer having an intrinsic viscosity of at least about 0.01 measured at 25° C.

3. A method as defined in claim 2 wherein the compounds are heated to a temperature of at least 40° C. for the reaction.

4. A method as defined in claim 2 wherein the nitrogen atom of the ortho-amine functions is attached to a carbon atom in the aromatic ring.

5. A method as defined in claim 2 wherein the aromatic nucleus is polycyclic.

6. A method as defined in claim 2 wherein the aromatic tetramine is monocyclic.

7. A method as defined in claim 5 wherein the aromatic tetramine has a polycyclic fused ring structure.

8. A method as defined in claim 5 wherein the aromatic tetramine is bi-cyclic having the aromatic rings attached by carbon-to-carbon bonds.

9. The method as defined in claim 2 wherein the tetramine is 3,3'-diaminobenzidine.

10. A method as defined in claim 2 wherein the tetramine is 1,2,4,5-tetraaminobenzene.

11. A method as defined in claim 2 wherein the tetramine is 3,3',4,4'-tetraaminodiphenylether.

12. A method as defined in claim 2 wherein the aromatic tetramine compound is in the form of salt of an inorganic acid.

13. A method as defined in claim 11 wherein the tetramine is in the form of the tetrachloride salt.

14. The method as defined in claim 2 wherein the tetracarbonyl compound is paraphenylenediglyoxal.

15. A method as defined in claim 2 wherein the tetracarbonyl compound is meta-phenylenediglyoxal.

16. A method for the preparation of quinoxaline polymers as defined in claim 2 wherein the aromatic tetramine compound is selected from the group consisting of:

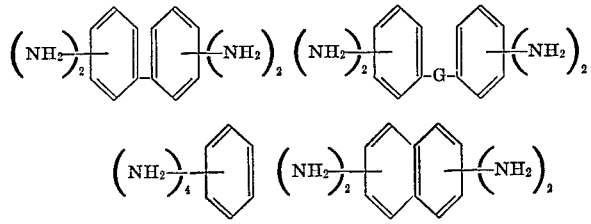

and salts thereof and wherein
G represents a divalent group selected from the group consisting of alkylene, arylene, aralkylene, alkarylene, oxygen, sulfur, alkylboron, arylboron, dialkylsilicon, and diarylsilicon,
and the tetracarbonyl compound is selected from the group consisting of compounds represented by the general formula:

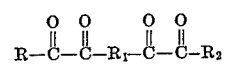

and the hydrates thereof, wherein
R and $R_2$ are members selected from the group consisting of hydrogen, alkyl, aryl, alkaryl and aralkyl, and
$R_1$ is a member selected from the group consisting of alkylene, arylene, aralkylene and alkarylene.

17. The method as defined in claim 3 wherein the reaction is carried out in the presence of a solvent.

18. The method as defined in claim 17 wherein the solvent is a member selected from the group consisting of water, dioxane, chloroform, methylenechloride, 1,2-dichloroethane, dimethyl sulfoxide, dimethyl formamide, hexamethylphosphoramide and phenols.

19. The method of claim 2 wherein the monomer mixture is heated to a temperature equal to at least the melting point of the monomers for at least about ½ hour, thereafter heated to a temperature of at least about 200° C. for at least about 2 hours and thereafter heated at reduced pressure to a temperature of at least about 300° C. for at least about 2 hours.

20. The method as defined in claim 2 wherein the initial reaction is carried out in a solvent at about reflux temperatures and thereafter the polymerization is completed under reduced pressure at a temperature of at least about 150° C.

21. The method as defined in claim 2 wherein the reaction is conducted in the absence of solvent by heating the monomers to the melting temperature of at least one of the monomers under an inert atmosphere and subsequently removing water formed during the polymerization reaction.

22. The method as defined in claim 21 wherein the polymer resulting from the reaction is further heated to a temperature of at least 200° C. for a sufficient period of time to increase the molecular weight.

23. The method as defined in claim 2 wherein a solution of the monomer is refluxed and a precipitate of the polymer resulting from the reaction is obtained.

24. The method as defined in claim 2 wherein a solution of the monomers is refluxed for a sufficient period of time and then the solvent is removed therefrom to obtain a polymer.

25. The method as defined in claim 24 wherein the polymer is subsequently heated in an inert atmosphere to a temperature of at least 150° C. to obtain a polymer of increased molecular weight.

26. The method as defined in claim 24 wherein the polymer is still further heated to at least 150° C. for up to 6 hours and then heated up to at least 300° C. for at least 1 hour.

27. A polymer which comprises recurring quinoxaline groups and which is the reaction product of an aromatic tetramine compound containing two sets of ortho-amine functions attached to the aromatic nucleus and a diglyoxal-type tetracarbonyl compound having two terminal groups of the structure

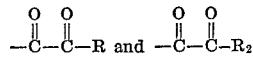

respectively, and wherein R and $R_2$ are selected from the group consisting of hydrogen and monovalent hydrocarbon groups, said polymer having an intrinsic viscosity of at least about 0.01 measured at 25° C.

28. A polymer which comprises recurring quinoxaline groups and which is the reaction product of an aromatic tetramine compound containing two sets of ortho-amine functions attached to the aromatic nucleus and a tetracarbonyl compound selected from the group consisting of compounds represented by the structure:

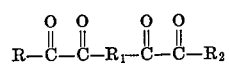

and the hydrates thereof, wherein,
R and $R_2$ are selected from the group consisting of hydrogen and monovalent hydrocarbon groups and
$R_1$ is a divalent hydrocarbon group, said polymer having an intrinsic viscosity of at least about 0.01 measured at 25° C.

29. A polymer as defined in claim 28 wherein the nitrogen atoms of the aromatic tetramine compound are attached to a carbon atom of the aromatic nucleus.

30. A polymer as defined in claim 28 wherein the molecular weight is at least 5000.

31. A polymer as defined in claim 28 which is a solid, resinous polymer.

32. A polymer as defined in claim 28 wherein the tetramine is a bi-cyclic compound having the aromatic rings attached by carbon-to-carbon bonds.

33. A polymer as defined in claim 28 wherein the aromatic tetramine having two sets of ortho-amine functions attached to the aromatic nucleus is selected from the group consisting of:

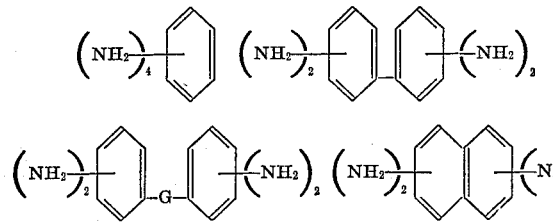

and salts thereof and wherein

G represents a divalent group selected from the group consisting of alkylene, arylene, aralkylene, alkarylene, oxygen, sulfur, alkylboron, arylboron, dialkylsilicon, diarylsilicone.

34. An adhesive composition comprising a quinoxaline polymer which is the reaction product of an aromatic tetramine compound containing two sets of ortho-amine functions attached to the aromatic nucleus and a diglyoxal-type tetracarbonyl compound having two terminal groups of the structure

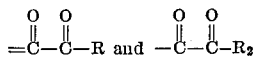

respectively, and wherein R and $R_2$ are selected from the group consisting of hydrogen and monovalent hydrocarbon groups, said polymer having an intrinsic viscosity of at least about 0.01 measured at 25° C.

35. An adhesive composition comprising a quinoxaline polymer which is the reaction product of an aromatic tetramine compound containing two sets of ortho-amine functions attached to the aromatic nucleus and a tetracarbonyl compound selected from the group consisting of compounds represented by the structure:

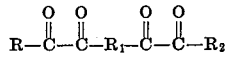

and the hydrates thereof, wherein

R and $R_2$ are members selected from the group consisting of hydrogen and monovalent hydrocarbon groups and $R_1$ is a divalent hydrocarbon group, and a solvent, said polymer having an intrinsic viscosity of at least about 0.01 measured at 25° C.

36. A self-supporting film formed from the polymer defined in claim 28.

37. A fiber formed from the polymer defined in claim 28.

38. An article having on the surface thereof and being coated with a quinoxaline polymer comprising the reaction product of an aromatic tetramine compound containing two sets of ortho-amine functions attached to the aromatic nucleus and salts thereof, with a tetracarbonyl compound selected from the group consisting of structures represented by the formula:

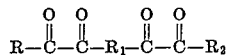

and the hydrates thereof, wherein

R and $R_2$ represent a member selected from the group consisting of hydrogen and monovalent hydrocarbon groups, and $R_1$ represents a divalent hydrocarbon group, said polymer having an intrinsic viscosity of at least about 0.01 measured at 25° C.

39. An article having on the surface thereof and being coated with a quinoxaline polymer comprising the reaction product of an aromatic tetramine compound containing two sets of ortho-amine functions attached to the aromatic nucleus and salts thereof, with a diglyoxal-type tetracarbonyl compound having two terminal groups of the structure

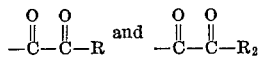

respectively, and wherein R and $R_2$ are selected from the group consisting of hydrogen and monovalent hydrocarbon groups, said polymer having an intrinsic viscosity of at least about 0.01 measured at 25° C.

References Cited

UNITED STATES PATENTS 2,895,944   7/1959   Mark _____ 260—65

OTHER REFERENCES

Sorenson, W. R.: Reprints of papers presented at Chicago meeting, Am. Chem. Soc., September 1961, pp. 229–231.

WILLIAM H. SHORT, Primary Examiner

L. L. LEE, Assistant Examiner

U.S. Cl. X.R.

117—161 LN, 161 UN; 161—213; 260— 30.6 R, 30.8 DS, 31.2 N, 32.6 N, 33.4 P, 65, 72.5, 241

UNITED STATES PATENT OFFICE
CERTIFICATE OF CORRECTION

Patent No. 3,661,850　　　　　　　　　Dated　May 9, 1972

Inventor(s)　　　　　John K. Stille

It is certified that error appears in the above-identified patent and that said Letters Patent are hereby corrected as shown below:

| Column | Line | | | | |
|---|---|---|---|---|---|
| 1 | 49 | "mterials" | should read | | materials |
| 1 | 68 | "posses" | " | " | possess |
| 2 | 17 | "comence" | " | " | commence |
|   |    | "here" | " | " | there |
| 2 | 30 | 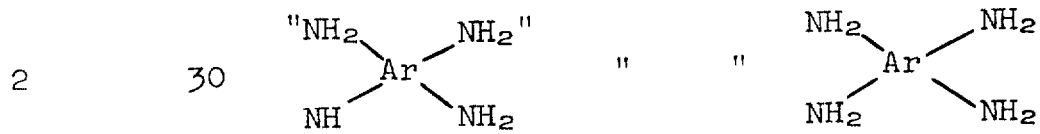 | " | " | |

| 4 | 5 | The Structure |

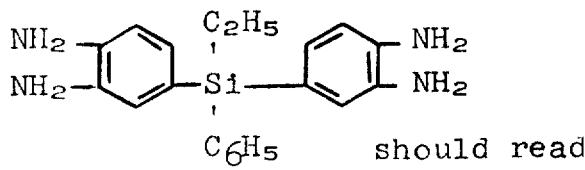 should read

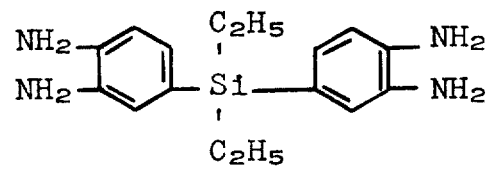

UNITED STATES PATENT OFFICE
CERTIFICATE OF CORRECTION

Patent No. 3,661,850        Dated May 9, 1972

Inventor(s)      John K. Stille

It is certified that error appears in the above-identified patent and that said Letters Patent are hereby corrected as shown below:

| Column | Line |  |  |  |
|---|---|---|---|---|
| 4 | 10 | The Structure 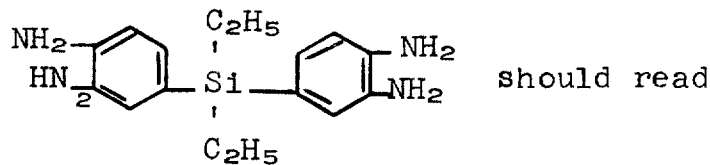 should read 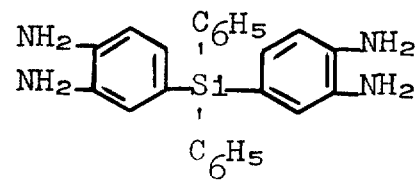 |  |  |
| 5 | 4 | "12,4,5-" | should read | 1,2,4,5- |
| 5 | 12 | "Hely." | " " | Helv. |
| 5 | 34 | "ylphosphoramide phenols" | " " | ylphosphoramide, phenols |
| 6 | 15 | "tat" | " " | that |
| 6 | 74 | "3,3'-diamino benzidine" | " " | 3,3'-diamino-benzidine |

- 3 -

UNITED STATES PATENT OFFICE
CERTIFICATE OF CORRECTION

Patent No. 3,661,850      Dated May 9, 1972

Inventor(s) John K. Stille

It is certified that error appears in the above-identified patent and that said Letters Patent are hereby corrected as shown below:

| Column | Line | | | | |
|---|---|---|---|---|---|
| 7  | 51 | "eating" | should read | heating |
| 8  | 35 | "mole) or" | " | " | mole) of |
| 9  | 35 | "(7,7)diquinox-aline]" | " | " | (7,7) oxydiquinoxaline] |
| 9  | 64 | "tetramino-diphenyl" | " | " | tetraminodiphenyl |
| 10 | 51 | "Ths" | " | " | This |
| 10 | 53 | "alliquots" | " | " | aliquots |
| 10 | 74 | "3,3'4,4'" | " | " | 3,3',4,4' |
| 11 | 50 | "indicats" | " | " | indicates |
| 11 | 66 | "2,2'-diamino-benzidine" | " | " | 3,3'-diamino-benzidine |
| 12 | 18 | "Exampel" | " | " | Example |
| 13 | 45 | "tetrachloride" | " | " | tetrahydrochloride |
| 14 | 35 | "monomer" | " | " | monomers |
| 15 | 32 | "diarylsilicone" | " | " | diarylsilicon |
| 15 | 40 | $"=\overset{O}{\underset{\|}{C}}-\overset{O}{\underset{\|}{C}}-R"$ | " | " | $-\overset{O}{\underset{\|}{C}}-\overset{O}{\underset{\|}{C}}-R$ |

Signed and sealed this 26th day of December 1972.

(SEAL)
Attest:

EDWARD M.FLETCHER,JR.      ROBERT GOTTSCHALK
Attesting Officer      Commissioner of Patents